United States Patent [19]

Bennett

[11] Patent Number: 5,741,135
[45] Date of Patent: Apr. 21, 1998

[54] AUTOMATED TRAINING AIDS METHOD

[75] Inventor: Steven James Bennett, Maple Grove, Minn.

[73] Assignee: United Defense LP, Arlington, Va.

[21] Appl. No.: 719,111

[22] Filed: Sep. 24, 1996

Related U.S. Application Data

[63] Continuation of Ser. No. 254,858, Jun. 6, 1994, abandoned.
[51] Int. Cl.⁶ .................................................. G09B 19/00
[52] U.S. Cl. .................... 434/118; 434/219; 434/307 R; 434/365; 395/173; 345/122
[58] Field of Search .................... 434/118, 169, 434/219, 224, 234, 307 R, 308, 322–365; 395/761, 762, 806, 807, 173, 118, 927; 345/22, 117, 122

[56] References Cited

U.S. PATENT DOCUMENTS

| | | | |
|---|---|---|---|
| 4,109,938 | 8/1978 | Mitchell et al. | 434/365 X |
| 4,576,578 | 3/1986 | Parker et al. | 434/307 R |
| 4,671,772 | 6/1987 | Slade et al. | 434/307 R X |
| 4,867,685 | 9/1989 | Brush et al. | 434/234 |
| 4,884,972 | 12/1989 | Gasper | 434/307 R X |
| 4,964,803 | 10/1990 | Chul | 434/118 |
| 5,240,419 | 8/1993 | deGyarfas | 434/118 X |
| 5,302,132 | 4/1994 | Corder | 434/307 R X |
| 5,306,154 | 4/1994 | Ujita et al. | 434/219 X |
| 5,326,270 | 7/1994 | Ostby et al. | 434/118 X |
| 5,372,507 | 12/1994 | Goleh | 434/118 |
| 5,395,243 | 3/1995 | Lubin et al. | 434/118 |

OTHER PUBLICATIONS

"Simple Science Experiments" Brochure of Discovery–Toys, Fall–Winter 1991, p. 43.
"The Acid Test: Five Years of Multimedia Chemistry" by Smith et al, IBM Multimedia Supplement to T.H.E. Journal, Sep. 1991, pp. 21–23.
"Software for Education Catalog: Pre–Kindergarten to Adult Tools for Education", IBM brochure, 1991/92 Edition, pp. 57–59 and 63.
"Programs Dad Can Call His Own", The Washington Post, Style Section (p. B5), Dec. 13, 1993.

*Primary Examiner*—Joe Cheng
*Attorney, Agent, or Firm*—Douglas W. Rudy; Michael B. K. Lee

[57] ABSTRACT

The invention provides a method and apparatus for animating and coloring hydraulic, electrical, electromechanical and similar schematic systems, components and designations to anble repeatable visual review and study. The invention provides, inter alia, a training aid for study, evaluation, design and maintenance of a system.

6 Claims, 8 Drawing Sheets

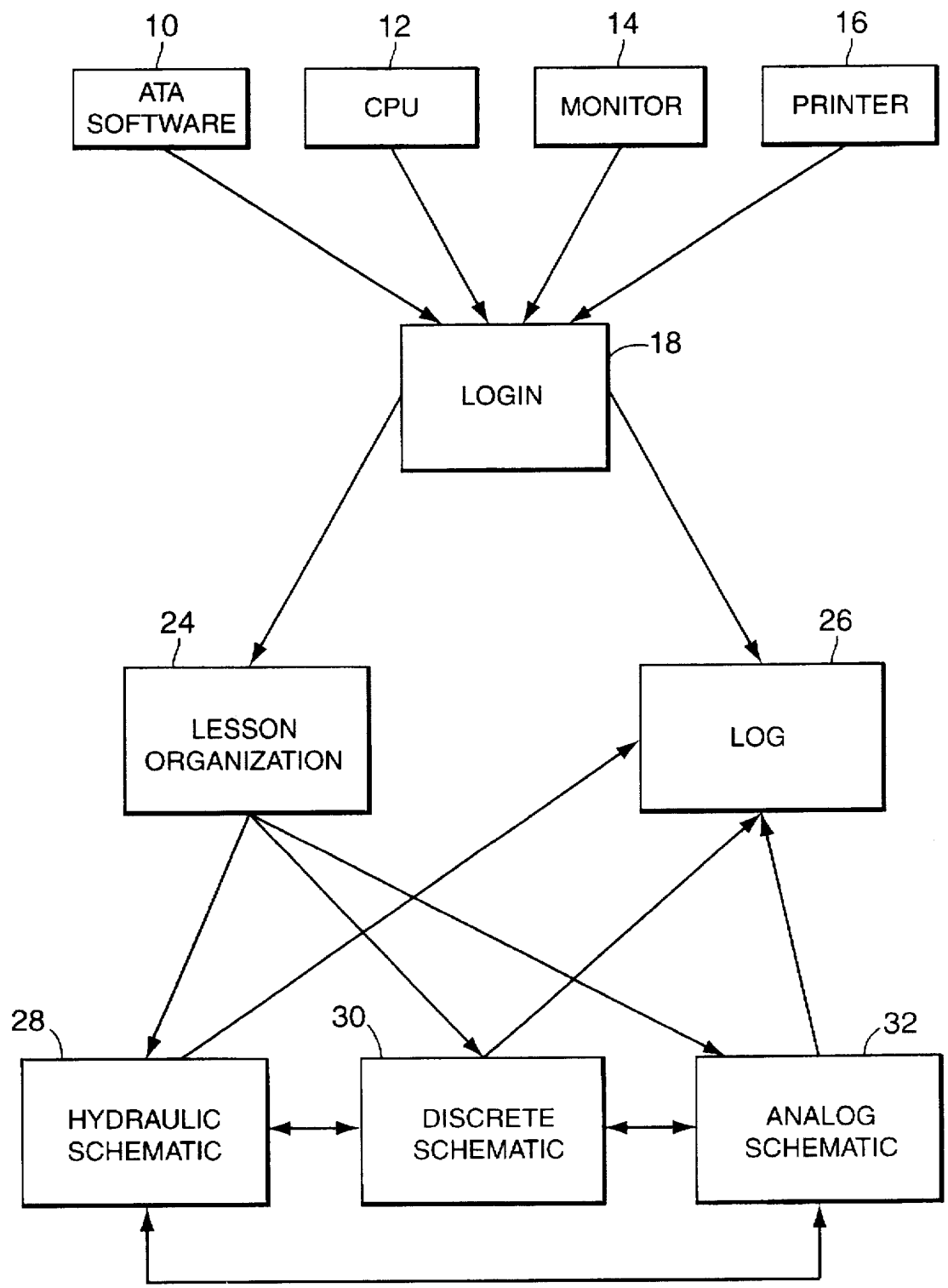

FIG. 5
AUTOMATED TRAINING AID
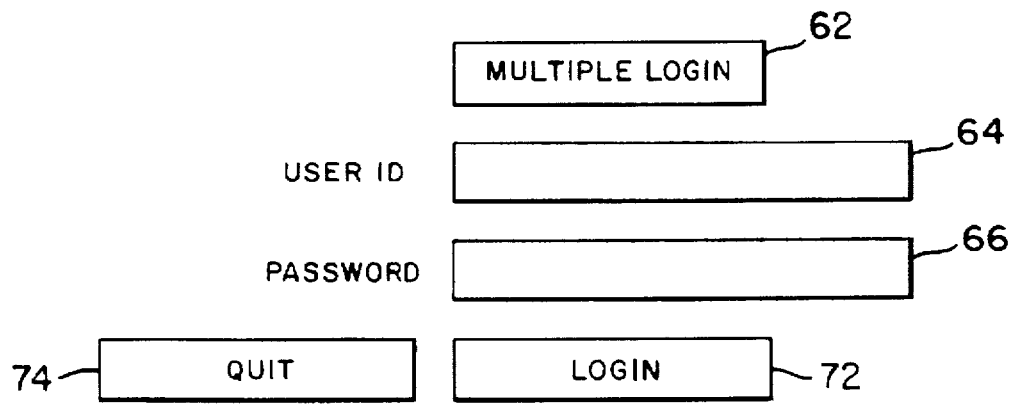
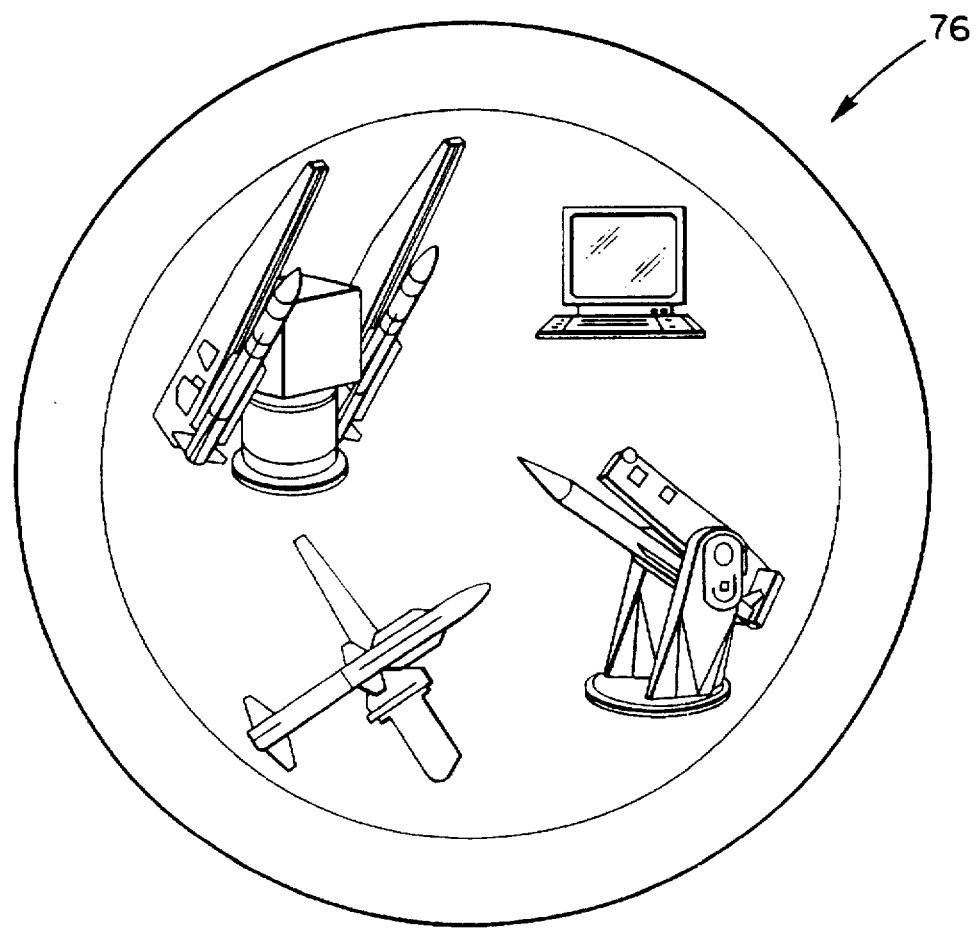

AUTOMATED TRAINING AIDS METHOD

This is a Continuation of application Ser. No. 08/254,858 filed Jun. 6, 1994, now abandoned.

A portion of the disclosure of this patent document contains material which is subject to copyright protection. The copyright owner grants reproduction as it appears in the Patent and Trademark Office patent file or records but otherwise reserves all copyrights whatsoever.

FIELD OF THE INVENTION

A computer based training tool to teach system operations and provide simulated hands-on practice of, inter alia, mechanical, electrical, hydraulic and electro-mechanical systems. The present invention includes integration of hydraulic and electronic circuit systems with keys to control access to the system, create a student log and display integrated technical data for a selected list of systems. Particularly, the integration of hydraulic and electronic animations, user interaction and technical data and system administration comprise some of the significant aspects of the present invention.

DESCRIPTION OF THE PRIOR ART

Diagnostic softwares are used to provide graphics and user interface for several applications. However, the prior art did not include animations in analog and digital electronic circuits. Further, tools such as student log; technical data; and login/logout capability are not known in the prior art.

SUMMARY OF THE INVENTION

The present invention provides an integrated training aid for hydraulic, mechanical, electro-mechanical and electronic circuits which through animated control and color-coding enables heretofore unavailable options and user friendly features. For example, computer graphics, generated using the tools developed in this invention, were used to animate the hydraulic and electrical operation of the Guided Missile Launching System (GMLS) MK13. The procedure is novel in that it replaces the need for coloring schematic drawings in order for the student to learn and understand sequence of operation and component behavior. The Automated Training Aid proffers significant advances by means of animations which includes color-coding features to help the student to better visualize system operations and controls. Further, the present invention provides interaction between hydraulic, electric and electro-mechanical systems. The advantages proffered by the invention are better understood with an examination of the following drawings and the specifications relating thereto.

BRIEF DESCRIPTION OF THE DRAWINGS

FIG. 1 is a representation of the hardware and software interaction which produce the simulated displays of the present invention.

FIG. 5 is a reproduction of a functionality screen for display on a computer monitor showing the optional menu to initiate the Automatic Training Aid system.

DESCRIPTION OF THE PREFERRED EMBODIMENT

Figure 2A:
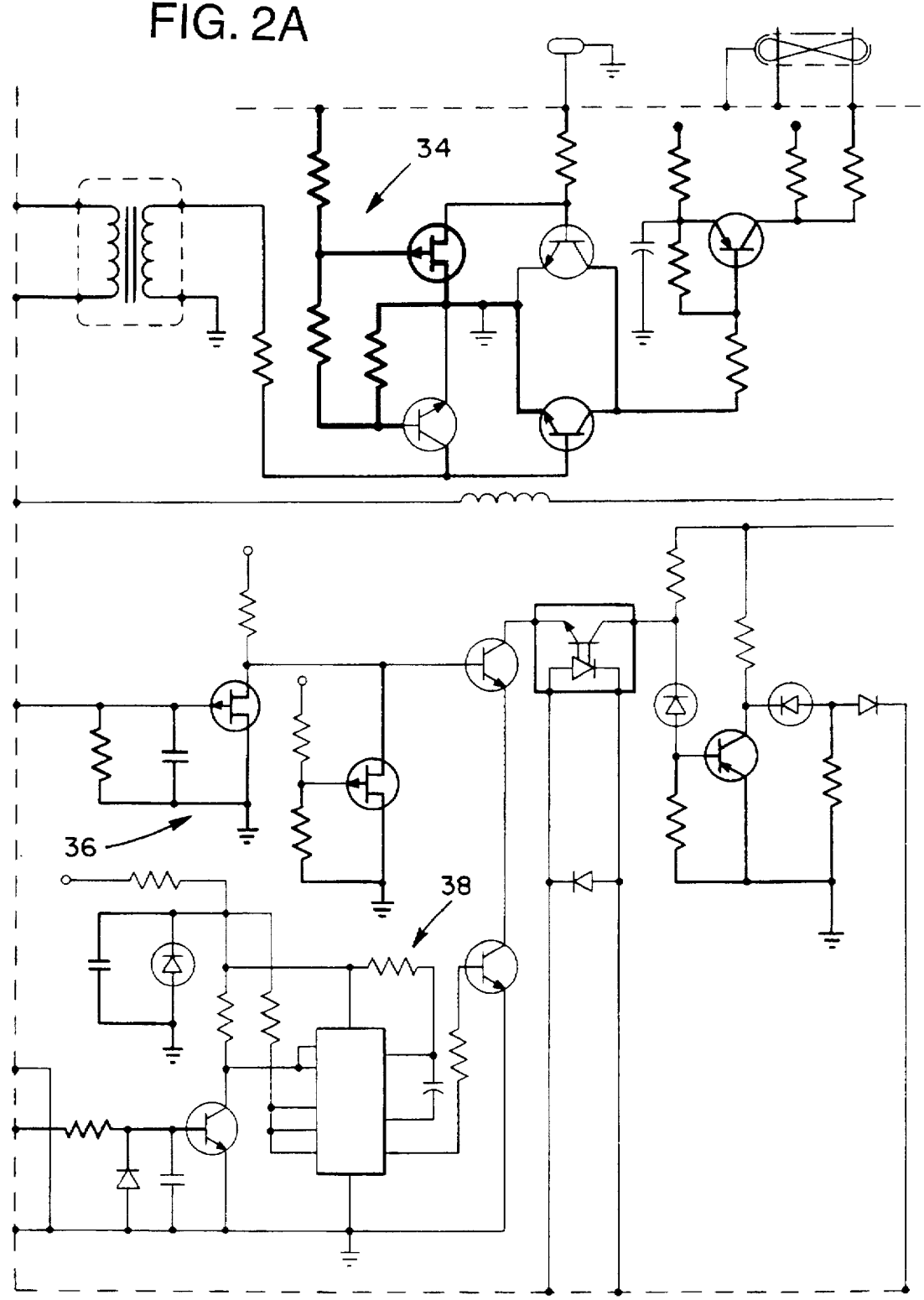
FIG. 2 is an electrical schematic with varying shades to show the stages at which a transistor has processed a signal.

In the preferred embodiment a mouse and keyboard are used; however, alternative input means such as toggles or a track ball may be used. Referring to FIG. 1, the Automatic Training Aid (ATA) software 10 cooperates with a computer 11. Computer 11 includes a CPU 12, a monitor 14 and a printer 16. These elements form the structure for login key 18. Login key 18 comprises lesson organization system 24 and log text box 26. These units in turn interact with specific lessons which include, inter alia, hydraulic schematic 28, discreet schematic 30 and analog schematic 32.

Referring to FIG. 2A an electrical schematic is shown. ATA software 10, animates segments of the schematic by means of various colors to indicate prevailing status. For example, If a transistor is not colored it has not processed a signal. The circuit under the heavy line 34 may designate DC power. The less heavy line 36 may designate DC signal and the faint line 38 may designate an AC power. Each of the differentially shaded areas may be animated to distinguish them as well as to train the student the operations of the circuit.

Figure 2B:
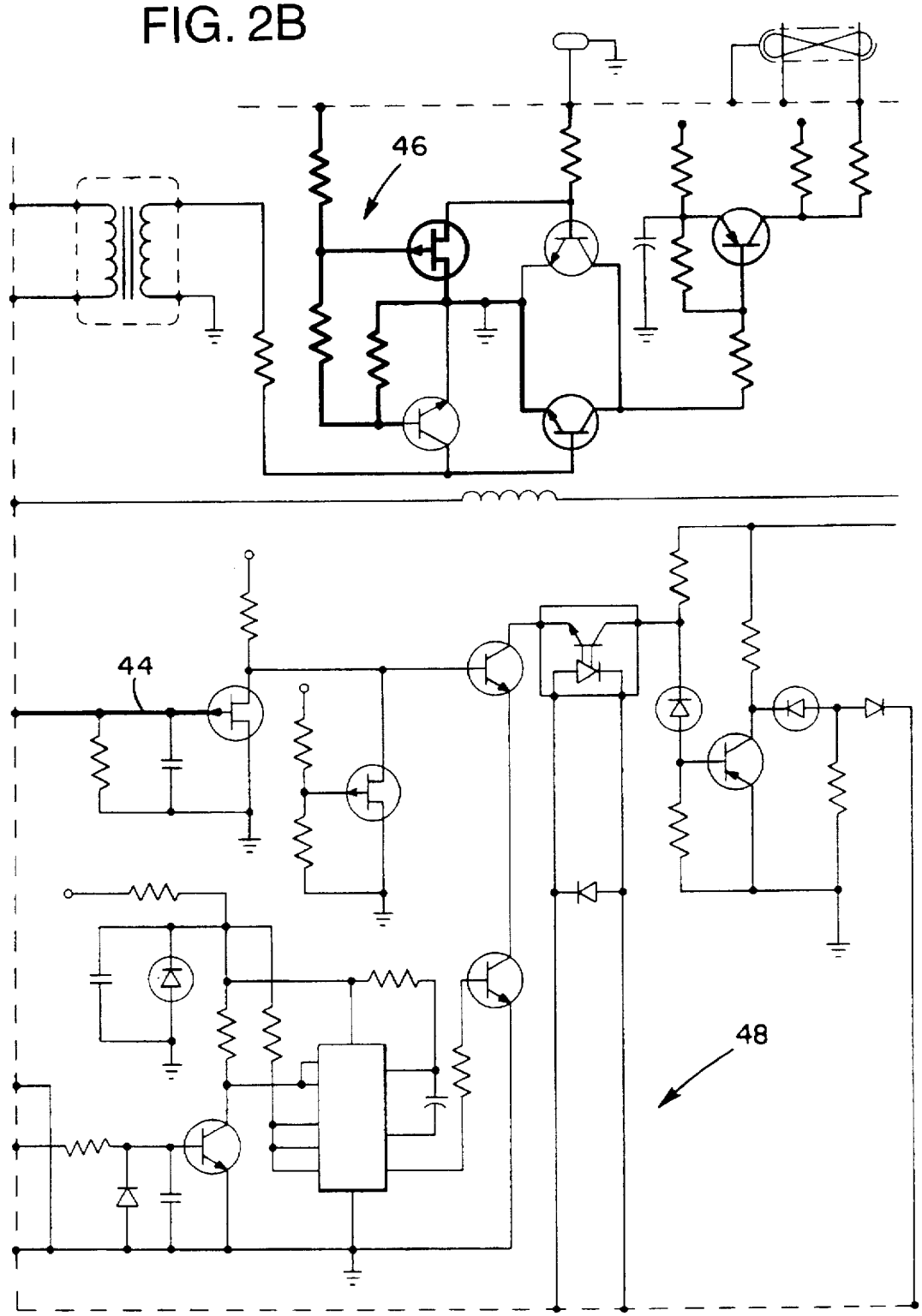

Referring to FIG. 2B, heavy line circuit area 44 is equivalent to a color coded section to show that it has processed a signal. Similarly less heavy line circuit segment 46 indicates the signal processing of that circuit. Light line circuit segment 48 indicates that a signal has not yet been processed.

Figure 3:
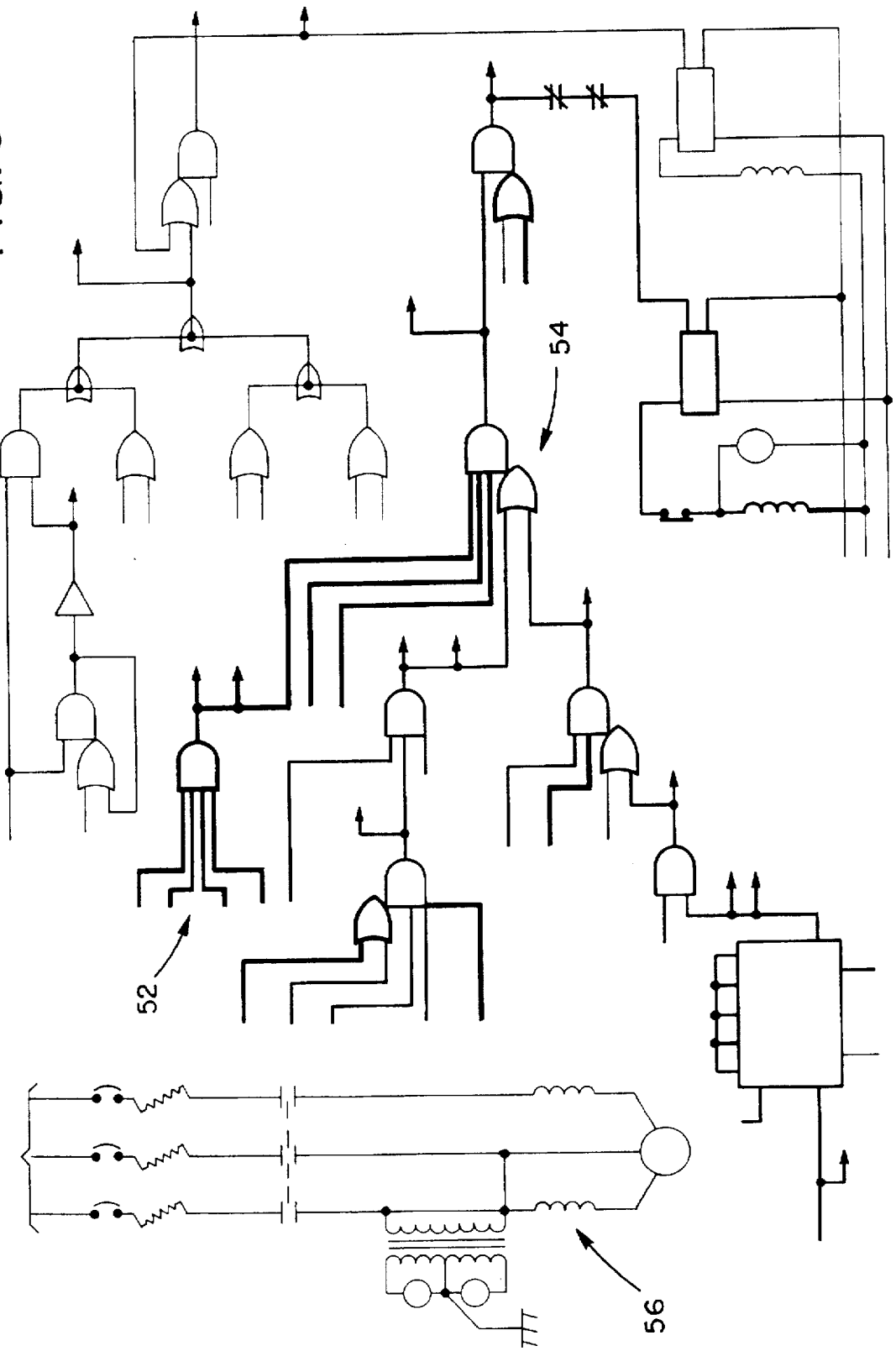
FIG. 3 is an electrical schematic displaying the processing of control signals used to drive the hydraulic schematics.

Referring to FIG. 3, circuit segment 52 shows that the circuit is off; and segment 56 is on and segment 54 is off.

Figure 4:
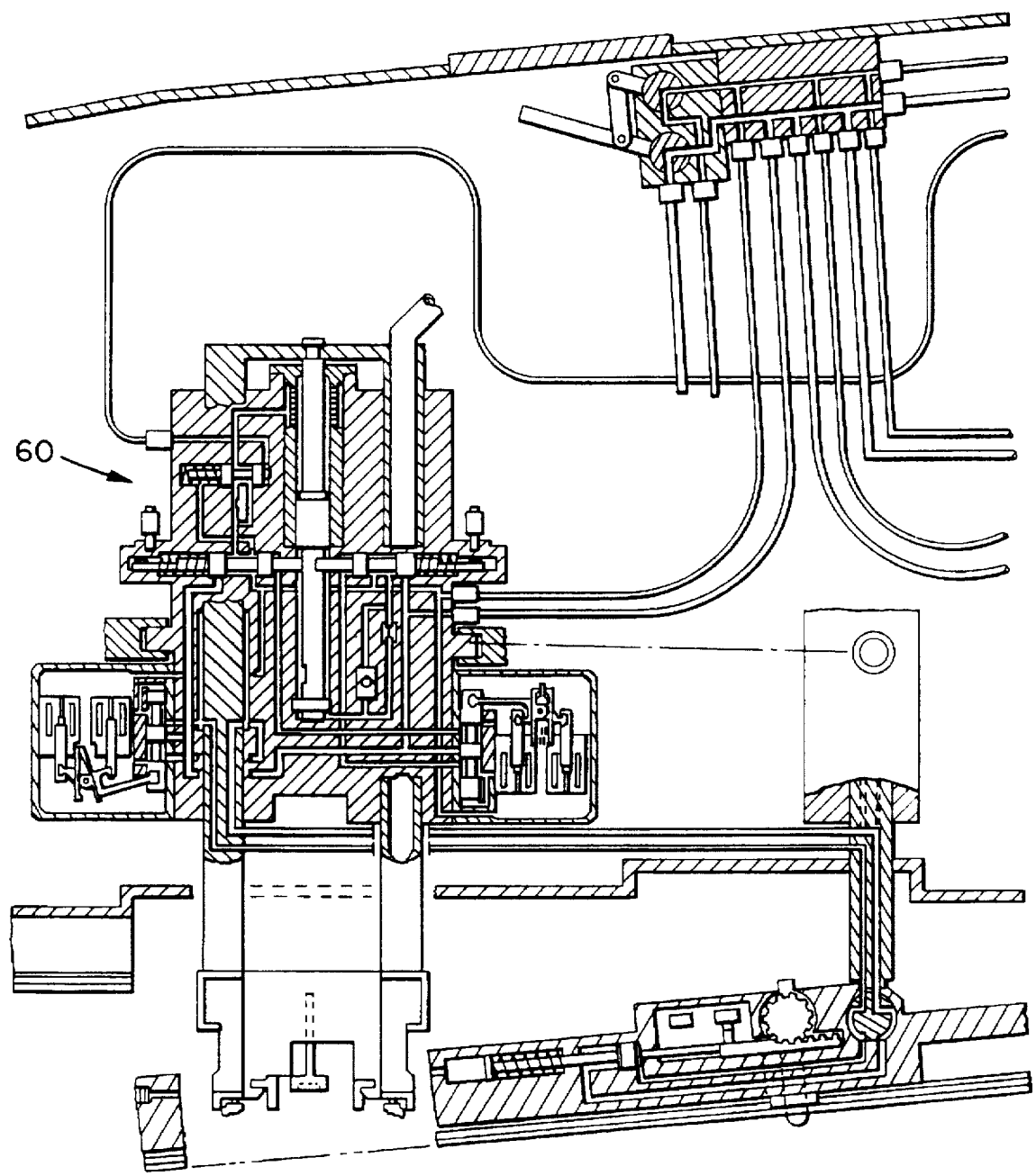
FIG. 4 is a hydraulic mechanical schematic.

FIG. 4 shows launcher guide arm hydraulic-mechanical schematic 60 in which a sequence of operations may be displayed using the ATA system. FIG. 5 is a reproduction of a functionality screen. The multiple login 62, User ID 64, Password 66 Login 72 and quit 74 are displayed along with the ATA logo 76. Each icon or button causes an action which initiates the program as desired.

Figure 6A:
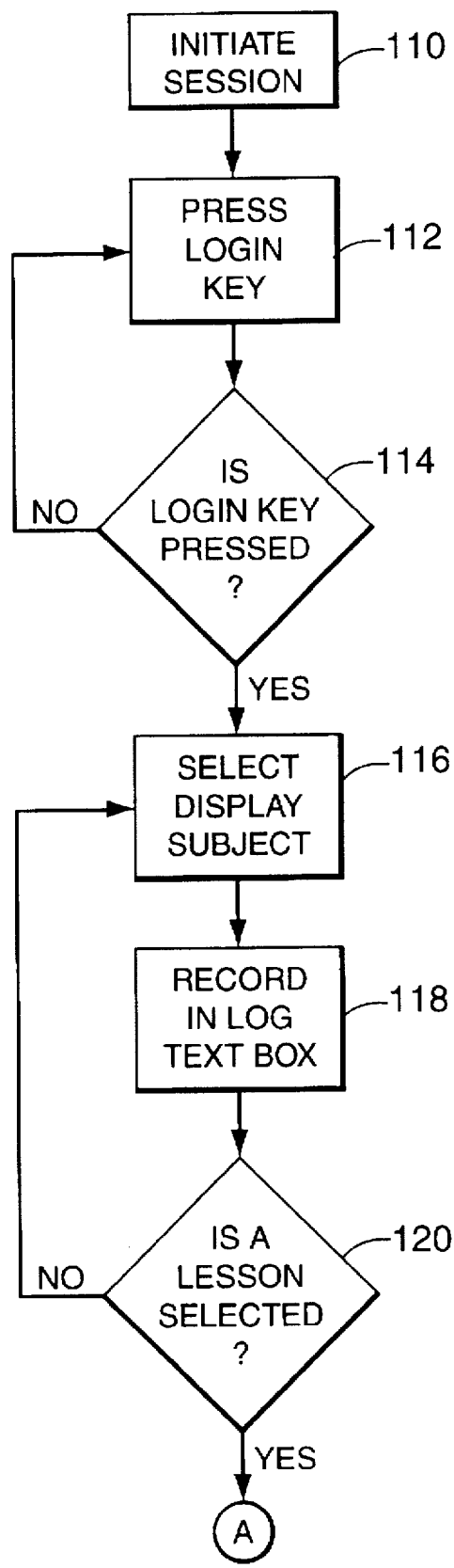
FIGS. 6A–6B represent a flow diagram depicting the logic steps of the present invention.
Figure 6B:
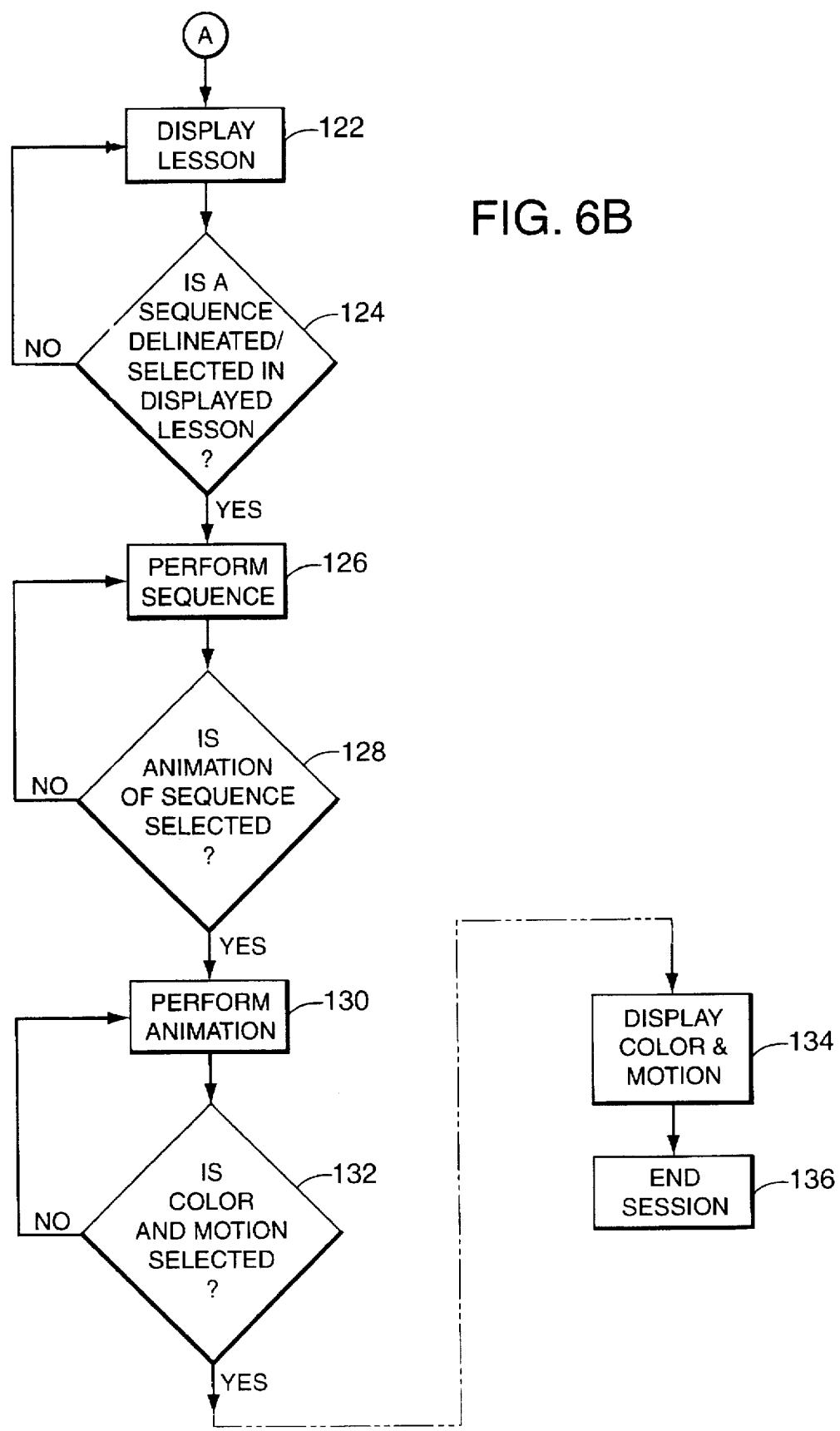

An overview of the present method is presented in FIGS. 6A–6B. In step 110 the session is initialed by the user providing the user ID and password and pressing login key 18 in step 112. If the login key 18 is not depressed, the logic goes into a subroutine and stays idle at logic step 112. In the alternate, if the login is pressed, the program logic (step 114) provides for a loop which displays login key 18 until it is pressed or selected. In step 116 the user then select a display subject as enabled by the program code within lesson organization system 24. Once the display subject is selected the user login event and selected display subject are recorded in log text box 26 in step 118. If step 120 if a lesson has not been selected, the program loops back to enable the user to select a display subject. After a lesson has been selected, the lesson is then displayed in step 122. If a sequence is not delineated or selected in the displayed sequence, the program loop back to further display the lesson in step 124. Once a sequence is delineated or selected, the sequence is then performed or displayed in step 126. If animation of the selected sequence is not selected, the program loops back to the selected sequence until animation is selected. When animation is selected, the animation is performed in step 130. Within the animated sequence, color and motion is then selected. If color and motion is not selected, the program loops back to perform the animation in step 132. If color and motion is selected, the program displays the selected color and motion in step 134, which completes the session in step 136.

The discussion hereinabove indicates the structural aspects of the present invention. The functional and cooperative aspects of the elements is discussed hereinbelow.

The ATA system utilizes computer animated schematics and subassemblies to visually display the construction, application and operation of mechanical, electronic and electro-mechanical systems. One of the primary advantages proferred by the present invention include the enablement of students to interact with the ATA animated schematics. The ATA system uses color and motion. The combined use of colors and motion enable the user to identify the physical properties of a component and visually delineate a sequence of events by tracing the path of operation.

The ATA is initiated by using the login key 18. The ATA system may only be accessed through login key 18 comprising a login stack. The login stack supports system administration tasks associated with creating user ID's for instructor and students. The user ID's are used to login to ATA. Login stack also provides access to diagram stacks, which contain schematic simulations. Login stack and the diagram stacks record the activities performed by the user (instructor or student) in a log stack. After lesson organization system 24 and Log 26 text boxes are pressed, select Lesson window appears and the ATA login is completed. Login 18 allows the student to log into the system. Login 18 is recorded in the log and the student is directed to lesson organization 24. Lesson organization system 24 allows the user to select the lesson to be viewed. The student is then directed to any one of the schematics to be selected. Accordingly, hydraulic schematics 28, discreet schematics 30, and analog schematics 32 may be selected. The scenario within hydraulic 28, discrete 30, and analog 32 may include one or a combination of the schematics. Accordingly, the ATA system enables controlled traversal between similarly situated schematic animations. Log 26 records the times and durations the student logs in and the schematic which was entered. The log in process requires the student logging in user ID and a password. The ID and the password are validated and the student is allowed to select a lesson; change a pass word or logout. If a lesson is selected the system displays the schematic corresponding to the student's selection.

The ATA tool is a set of computer implemented software instructions that extract information from the system model developed with a modeling tool to produce text files containing class definitions and simulation results. A diagram stack imports the class and instance definitions into a graphics card. A graphics tool is used to draw schematics and all moving components. From the graphics tool the schematic and all moving parts or animation are "cut and pasted" into a diagram template. Printer 16 comprises print scripts stack which contain code to print scripts (source code) found in the graphics card stack.

The animation is performed by coloring certain segments of a schematics. For example considering FIGS. 2A and 2B, the animation logic relevant to the transistors includes colored signals and an off signal. When the signal is off, the color is black. When a transistor has processed a signal, it is colored. Thus, an input signal may indicate a color if the signal is greater or equal to a preset threshold value.

The animation visually plots the sequence of events for a given schematics. For example, considering electrical schematics FIGS. 2A and 2B, the direction of electrical signal flow can be traced and system activation may be sequentially reviewed. To demonstrate component operation to the student, the ATA system provides single step and entire cycle modes. In a single step mode, forward or backward pushbuttons are selected to set a given schematic into motion. Each move enables an animated review of the particular step in the sequence. The ATA system traces the path of operation using color and motion. Accordingly, the student is able to visually follow a sequence of operation and thereby learn the process involved. Further, under the entire cycle mode, a forward or backward pushbutton is used to set the schematic into motion. A pause pushbutton may be used to temporarily suspend or delay a sequence. A stop button may be used to halt the sequence of events for the operation of a component. The entire cycle mode begins by tracing the path of operation using color and motion thereby illustrating the sequence of events for an operation of a component. An audio response announces when a cycle is complete. Each cycle contains one or more individual steps.

The ATA system and ATA software 10 incorporate several convenient features which make it adaptable and integrable to a variety of mechanical, electronic, hydraulic systems as well as a combination thereof. For example a show/hide legend enables to display or hide the legend for a schematic. Each legend is tailored to correspond to a specific animated schematic. Similarly, show/hide text display features allow the choice to either display or hide the text that identifies a specific component name and designation thereof. Furthermore, the ATA system incorporates an arrow pointer which may be displayed or concealed. The arrow pointer is used to pin point and highlight an area or component of interest in a schematic. The pointer may also be used to trace the path of operation for an event or sequence of events.

One of the principal applications of the present invention is to teach students the skills necessary to operate, maintain and/or design systems with functional components. The presently preferred embodiment of the invention is based on electrical, discrete and mechanical systems. The student is able to repeatedly review and exercise the operation of interest.

While a preferred embodiment of the ATA system has been shown and described, it will be appreciated that various changes and modifications may be made therein without departing from the spirit of the invention as defined by the scope of the appended claims.

What is claimed is:

1. A method for providing training lessons by animating hydraulic, mechanical, electro-mechanical and electronic circuits using a simulation software comprising the steps of:

integrating the simulation software with a computer;

providing a login function key;

providing a log text box;

providing a lesson organization key;

providing a set of training lessons within said lesson organization key, wherein said set of training lessons include segments of a schematic of said hydraulic, mechanical, electro-mechanical and electronic circuits animated by means of various colors to indicate a present status of said segments; and providing a communication between said lesson organization key, said log text box and said login function key, such that said present status of said segment of said hydraulic, mechanical, electro-mechanical and electronic circuits are animated as selected by a user.

2. The method according to claim 1, wherein said step of providing a login function key comprises a step of allowing said user to access said simulation software which includes a set of computer implemented software instructions.

3. The method according to claim 1 wherein said step of providing a set of training lessons provides at least one set of training lessons within said lesson organization key and further comprises schematics selected from a set consisting of hydraulic circuits, mechanical circuits, electro-mechanical circuits, electronic circuits and any combination thereof.

4. The method according to claim 1 wherein a color-coding is used to indicate a system status of a hydraulic schematic, discrete schematic and analog schematic.

5. A method for providing automated training lessons using a set of computer implemented software instructions that extract information from a system software to create animated displays comprising the steps of:

provimg a login function key;

providing a log text box;

providing a lesson organization key;

providing a set of training lessons within said lesson organization key, wherein said set of training lessons include segments of a schematic of hydraulic, mechanical, electro-mechanical and electronic circuits animated by means of various colors to indicate a present status of said segments; and providing a communication between said login function key, said log text box, said lesson organization key and said set of training lessons within said lesson organization key, such that said animated displays are created, said animated displays including schematics selected from a set consisting of hydraulic circuits, mechanical circuits, electro-mechanical circuits, electronic circuits, and any combination thereof.

6. The method according to claim 5 wherein said animated displays include at least one varied color-coding feature to distinguish at least one component and a sequence of operations.

* * * * *